United States Patent
Morioka et al.

(10) Patent No.: US 10,448,382 B2
(45) Date of Patent: Oct. 15, 2019

(54) TELECOMMUNICATIONS APPARATUS AND METHOD

(71) Applicant: SONY CORPORATION, Tokyo (JP)

(72) Inventors: Yuichi Morioka, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 15/544,383

(22) PCT Filed: Jan. 6, 2016

(86) PCT No.: PCT/EP2016/050111
§ 371 (c)(1),
(2) Date: Jul. 18, 2017

(87) PCT Pub. No.: WO2016/120028
PCT Pub. Date: Aug. 4, 2016

(65) Prior Publication Data
US 2018/0270795 A1 Sep. 20, 2018

(30) Foreign Application Priority Data
Jan. 30, 2015 (EP) .................................... 15153313

(51) Int. Cl.
*H04W 72/04* (2009.01)
*H04L 1/08* (2006.01)
(Continued)

(52) U.S. Cl.
CPC ............. *H04W 72/042* (2013.01); *H04L 1/08* (2013.01); *H04L 1/189* (2013.01); *H04L 1/1838* (2013.01);
(Continued)

(58) Field of Classification Search
CPC ........... H04W 72/042; H04W 72/0466; H04W 52/0216; H04W 52/0229; H04L 1/08;
(Continued)

(56) References Cited

U.S. PATENT DOCUMENTS 10,097,990 B2 * 10/2018 Balachandran ......... H04W 8/22
2006/0190610 A1 8/2006 Motegi et al.
(Continued)

FOREIGN PATENT DOCUMENTS

EP 1 686 716 A1 8/2006
EP 1 788 756 A1 5/2007
(Continued)

OTHER PUBLICATIONS

International Search Report dated Jun. 13, 2016 in PCT/EP2016/050111 filed Jan. 6, 2016.
(Continued)

*Primary Examiner* — Jay P Patel
(74) *Attorney, Agent, or Firm* — Xsensus LLP

(57) ABSTRACT

A method of transmitting downlink data in a mobile communications system, wherein the mobile communications system comprises a base station configured to communicate wireless signals to one or more terminal devices. The method comprises receiving an indicator of a maximum number of downlink repetitions "Nmax" currently accepted by a terminal device, wherein a number of downlink repetitions indicates a number of times that the same signal is transmitted to the terminal device; setting an actual number of downlink repetitions "Ntx" so that the actual number of downlink repetitions meets the condition Ntx≤Nmax; and transmitting the downlink data, to the terminal device, wherein the downlink data is transmitted via a signal transmitted a number of times equals to the actual number of downlink repetitions.

22 Claims, 9 Drawing Sheets

(51) Int. Cl.
*H04L 1/18* (2006.01)
*H04W 52/02* (2009.01)

(52) U.S. Cl.
CPC .......... *H04L 1/1877* (2013.01); *H04L 1/1887* (2013.01); *H04W 52/0216* (2013.01); *H04W 52/0229* (2013.01); *H04W 72/0446* (2013.01); *H04L 1/1845* (2013.01); *Y02D 70/00* (2018.01); *Y02D 70/122* (2018.01); *Y02D 70/1242* (2018.01); *Y02D 70/1262* (2018.01); *Y02D 70/21* (2018.01)

(58) Field of Classification Search
CPC ..... H04L 1/189; H04L 1/1887; H04L 1/1877; H04L 1/1838; H04L 1/1845; Y02D 70/1262; Y02D 70/122; Y02D 70/1242; Y02D 70/21; Y02D 70/00
See application file for complete search history.

(56) References Cited

U.S. PATENT DOCUMENTS

| | | | |
|---|---|---|---|
| 2007/0086403 | A1 | 4/2007 | Hatakeyama et al. |
| 2007/0109996 | A1 | 5/2007 | Jung |
| 2011/0004797 | A1 | 1/2011 | Gerstenberger et al. |
| 2011/0053657 | A1* | 3/2011 | Ji .................... H04W 52/0225 455/574 |
| 2011/0176593 | A1* | 7/2011 | Hultell ................ H04B 7/0404 375/224 |
| 2012/0257554 | A1* | 10/2012 | Kim ...................... H04L 5/001 370/280 |
| 2012/0307689 | A1* | 12/2012 | Kim ...................... H04L 1/1861 370/280 |
| 2015/0092566 | A1* | 4/2015 | Balachandran ......... H04W 8/22 370/242 |
| 2015/0140999 | A1* | 5/2015 | Zhang .............. H04W 36/0055 455/424 |
| 2015/0208278 | A1* | 7/2015 | Oizumi ................ H04L 1/0061 370/216 |
| 2016/0338136 | A1* | 11/2016 | Zhang .................. H04W 76/19 |
| 2017/0141833 | A1* | 5/2017 | Kim .......................... H04L 5/00 |
| 2017/0332367 | A1* | 11/2017 | Oizumi .................... H04L 1/00 |

FOREIGN PATENT DOCUMENTS

| | | |
|---|---|---|
| EP | 2 245 782 | 11/2010 |
| EP | 2 787 672 A1 | 10/2014 |

OTHER PUBLICATIONS

Holma, Harri et al., "LTE for UMTS OFDMA and SC-FDMA Based Radio Access," John Wiley and Sons, 2009, 4 pages.
ETSI TS 136 211 V11.5.0 (Jan. 2014), "LTE; Evolved Universal Terrestrial Radio Access (E-UTRA); Physical channels and modulation," 3GPP TS 36.211 version 11.5.0 Release 11, 2014, 122 pages.
ETSI TS 136 212 V11.4.0 (Jan. 2014),"LTE; Evolved Universal Terrestrial Radio Access (E-UTRA); Multiplexing and channel coding," 3GPP TS 36.212 version 11.4.0 Release 11, 2014, 86 pages.
ETSI TS 136 213 V11.6.0 (Mar. 2014), "LTE; Evolved Universal Terrestrial Radio Access (E-UTRA); Physical layer procedures," 3GPP TS 36.213 version 11.6.0 Release 11, 2014, 184 pages.
ETSI TS 136 321 V11.5.0 (Mar. 2014), "LTE; Evolved Universal Terrestrial Radio Access (E-UTRA); Medium Access Control (MAC) protocol specification," 3GPP TS 36.321 version 11.5.0 Release 11, 2014, 59 pages.
ETSI TS 136 331 V12.3.0 (Sep. 2014), "LTE; Evolved Universal Terrestrial Radio Access (E-UTRA); Radio Resource Control (RRC); Protocol specification," 3GPP TS 36.331 version 12.3.0 Release 12, 2014, 383 pages.
3GPP TSG-RAN1#70bis, "Effect of Restricting Maximum Transport Block Size on eNodeB Rate Control," General Dynamics Broadband, R1-124517, Oct. 2012, 4 pages.
3GPP TSG RAN Meeting #65, "New WI proposal: Further LTE Physical Layer Enhancements for MTC," Ericsson, Nokia Networks, RP-141660, Sep. 2014, 8 pages.
3GPP TSG RAN WG1 Meeting #72bis, "PDSCH/PUSCH coverage improvements for low-cost MTC," Renesas Mobile Europe Ltd, R1-131370, Apr. 2013, 5 pages.
3GPP TSG-RAN WG2 Meeting #87bis, "Limitations of current UE E-UTRA capability handling," Qualcomm Incorporated, R2-144118, Oct. 2014, 2 pages.

* cited by examiner

TELECOMMUNICATIONS APPARATUS AND METHOD

CROSS-REFERENCE TO RELATED APPLICATIONS

The present application claims priority to European Patent Application 15153313.0, filed in the European Patent Office on Jan. 30, 2015, the entire contents of which being incorporated herein by reference.

BACKGROUND

Field

The present disclosure relates to a method of transmitting downlink data in a mobile communications system; to a base station for transmitting downlink data in a mobile communications system; circuitry for a base station for transmitting downlink data in a mobile communications system; a method of receiving downlink data at a terminal in a mobile communications system; to a terminal device for receiving downlink data at a terminal in a mobile communications system; to circuitry for a terminal device for receiving downlink data at a terminal in a mobile communications system; to a method of setting a maximum number of downlink repetitions parameter for downlink transmissions in a mobile communications system; to a terminal device for setting a maximum number of downlink repetitions parameter for downlink transmissions in a mobile communications system; to circuitry for a terminal device for setting a maximum number of downlink repetitions parameter for downlink transmissions in a mobile communications system and to a wireless telecommunication system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile communication systems have evolved from the GSM System (Global System for Mobile communications) to the 3G system and now include packet data communications as well as circuit switched communications. The third generation partnership project (3GPP) has developed a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

One particular area which is being developed and promoted for mobile networks is so-called machine type communication (MTC) applications. MTC applications are in some respects typified by semi-autonomous or autonomous wireless communication devices (MTC devices) communicating small amounts of data on a relatively infrequent basis. Examples include so-called smart meters which, for example, are located in a customers home and periodically transmit data back to a central MTC server relating to the customer's consumption of a utility such as gas, water, electricity and so on. Smart metering is merely one example MTC application and there are many other situations in which MTC-type devices might be used, for example for traffic surveillance, e-healthcare and general monitoring applications. In general, MTC devices may be useful whenever there is a desire for devices to communicate wirelessly with some degree of autonomously (i.e. without human invention). Some typical characteristics of MTC type terminal devices/MTC type data might include, for example, characteristics such as low mobility, high delay tolerance, small data transmissions, infrequent transmission and group-based features, policing and addressing. Further information on characteristics of MTC-type devices can be found, for example, in the corresponding standards, such as ETSI TS 122 368 V11.6.0 (2012-09)/3GPP TS 22.368 version 11.6.0 Release 11).

It can be expected that some types of terminal device, such as MTC type terminal devices, may be relatively low-cost devices and might need to rely on battery power for extended periods. As such, it would be a benefit for such terminal devices to communicate with a base station while taking battery utilisation considerations into account. It is therefore desirable to improve mobile networks to help with low power communications, for example for low-power MTC devices.

SUMMARY

According to a first aspect of the present disclosure, there is provided a method of transmitting downlink data in a mobile communications system, wherein the mobile communications system comprises a base station configured to communicate wireless signals to one or more terminal devices. The method comprises receiving an indicator of a maximum number of downlink repetitions "Nmax" currently accepted by a terminal device, wherein a number of downlink repetitions indicates a number of times that the same signal is transmitted to the terminal device; setting an actual number of downlink repetitions "Ntx" so that the actual number of downlink repetitions meets the condition Ntx≤Nmax; and transmitting the downlink data, to the terminal device, wherein the downlink data is transmitted via a signal transmitted a number of times equals to the actual number of downlink repetitions.

According to another aspect of the present disclosure, there is provided a base station for transmitting downlink data in a mobile communications system, wherein the base station is configured to communicate wireless signals to one or more terminal devices. The base station is configured to: receive an indicator of a maximum number of downlink repetitions "Nmax" supported by a terminal device, wherein a number of downlink repetitions indicates a number of times that the same signal is transmitted to the terminal device; set an actual number of downlink repetitions "Ntx" so that the actual number of downlink repetitions meets the condition Ntx≤Nmax; and transmit the downlink data, to the terminal device, wherein the downlink data is transmitted via a signal transmitted a number of times equals to the actual number of downlink repetitions.

According to yet another aspect of the present disclosure, there is provided a circuitry for a base station for transmitting downlink data in a mobile communications system, wherein the base station is configured to communicate wireless signals to one or more terminal devices. The circuitry comprises a controller element and a transceiver element configured to operate together to: receive an indicator of a maximum number of downlink repetitions "Nmax" supported by a terminal device, wherein a number of downlink repetitions indicates a number of times that the same signal is transmitted to the terminal device; set an actual number of downlink repetitions "Ntx" so that the actual number of downlink repetitions meets the condition Ntx≤Nmax; and transmit the downlink data, to the terminal device, wherein the downlink data is transmitted via a signal transmitted a number of times equals to the actual number of downlink repetitions.

According to a further aspect of the present disclosure, there is provided a method of receiving downlink data at a terminal in a mobile communications system, wherein the mobile communications system comprises a base station configured to communicate wireless signals to one or more terminal devices. The method comprises: obtaining a maximum number of downlink repetitions "Nmax" for downlink transmissions to the terminal wherein a number of downlink repetitions indicates a number of times that the same signal is transmitted to the terminal device; setting the value of a decoding number of repetitions for downlink data "Ndec" at a first value wherein 1≤Ndec≤Nmax; and attempting to decode downlink data transmissions based on the decoding number of repetitions for downlink data.

According to another aspect of the present disclosure, there is provided a terminal device for receiving downlink data at a terminal in a mobile communications system, wherein the mobile communications system comprises a base station configured to communicate wireless signals to one or more terminal devices. The terminal device is configured to: obtain a maximum number of downlink repetitions "Nmax" for downlink transmissions to the terminal wherein a number of downlink repetitions indicates a number of times that the same signal is transmitted to the terminal device; set the value of a decoding number of repetitions for downlink data "Ndec" at a first value wherein 1≤Ndec≤Nmax; and attempt to decode downlink data transmissions based on the decoding number of repetitions for downlink data.

According to yet another aspect of the present disclosure, there is provided circuitry for a terminal device for receiving downlink data at a terminal in a mobile communications system, wherein the mobile communications system comprises a base station configured to communicate wireless signals to one or more terminal devices. The circuitry comprises a controller element and a transceiver element configured to operate together to: obtain a maximum number of downlink repetitions "Nmax" for downlink transmissions to the terminal wherein a number of downlink repetitions indicates a number of times that the same signal is transmitted to the terminal device; set the value of a decoding number of repetitions for downlink data "Ndec" at a first value wherein 1≤Ndec≤Nmax; and attempt to decode downlink data transmissions based on the decoding number of repetitions for downlink data.

According to a further aspect of the present disclosure, there is provided a method of setting a maximum number of downlink repetitions parameter for downlink transmissions in a mobile communications system, wherein the mobile communications system comprises a base station configured to communicate wireless signals to one or more terminal devices. The method comprises: obtaining an upper limit "Nup" for the number of downlink repetitions supported by a terminal device, wherein a number of downlink repetitions indicates a number of times that the same signal is transmitted to the terminal device; determining, based on the upper limit, a maximum number of downlink repetitions so that the maximum number of downlink repetitions is less than or equal to the upper limit; and transmitting an indicator of the maximum number of downlink repetitions to a base station.

According to another aspect of the present disclosure, there is provided a terminal device for setting a maximum number of downlink repetitions parameter for downlink transmissions in a mobile communications system, wherein the mobile communications system comprises a base station configured to communicate wireless signals to one or more terminal devices. The terminal device is configured to: obtain an upper limit "Nup" for the number of downlink repetitions supported by the terminal device, wherein a number of downlink repetitions indicates a number of times that the same signal is transmitted to the terminal device; determine, based on the upper limit and on a status of the terminal device, a maximum number of downlink repetitions so that the maximum number of downlink repetitions is less than or equal to the upper limit; and transmit an indicator of the maximum number of downlink repetitions to a base station.

According to yet another aspect of the present disclosure, there is provided circuitry for a terminal device for setting a maximum number of downlink repetitions parameter for downlink transmissions in a mobile communications system, wherein the mobile communications system comprises a base station configured to communicate wireless signals to one or more terminal devices. The circuitry comprises a controller element and a transceiver element configured to operate together to: obtain an upper limit "Nup" for the number of downlink repetitions supported by the terminal device, wherein a number of downlink repetitions indicates a number of times that the same signal is transmitted to the terminal device; determine, based on the upper limit and on a status of the terminal device, a maximum number of downlink repetitions so that the maximum number of downlink repetitions is less than or equal to the upper limit; and transmit an indicator of the maximum number of downlink repetitions to a base station.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
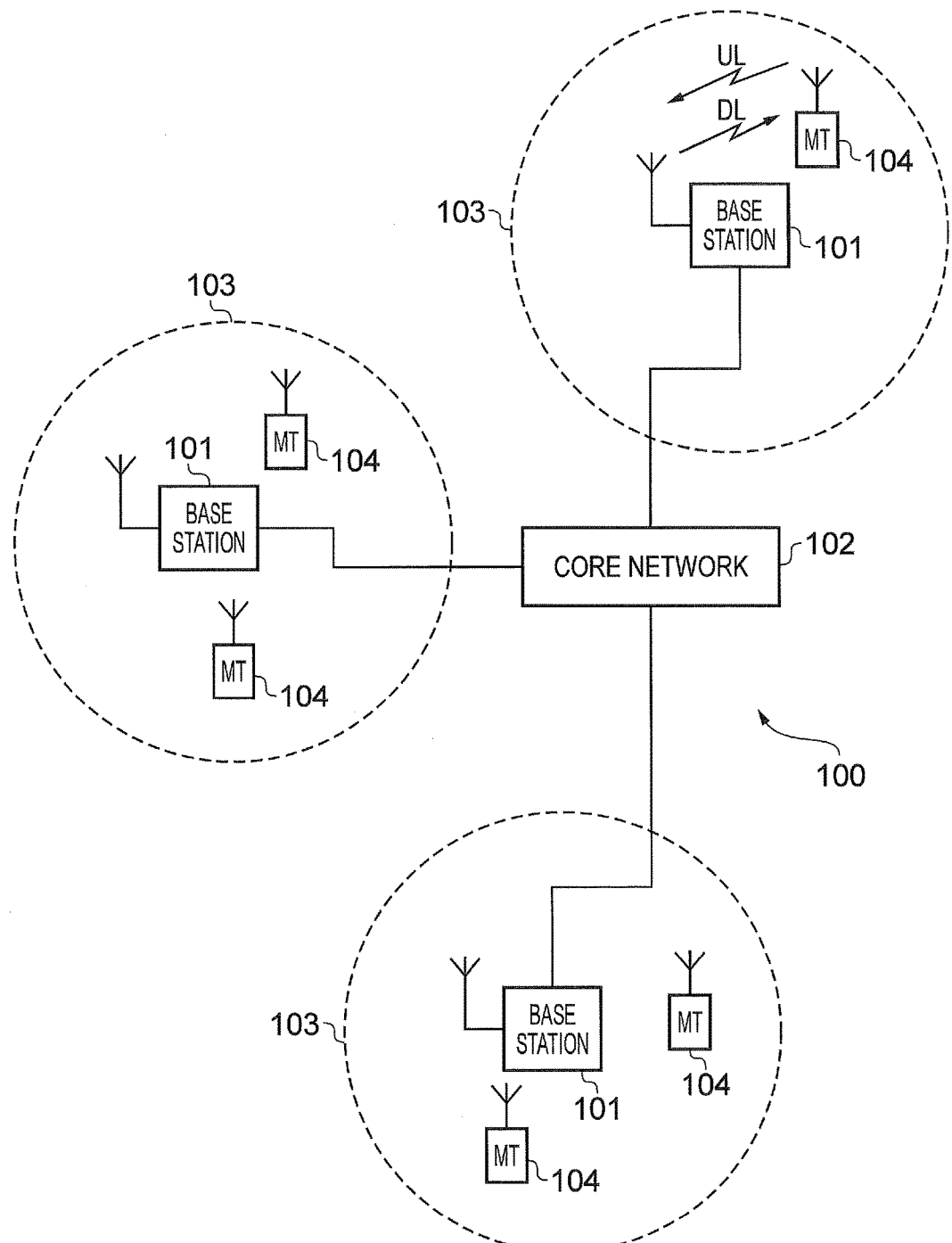
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licenced for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Figure 2:
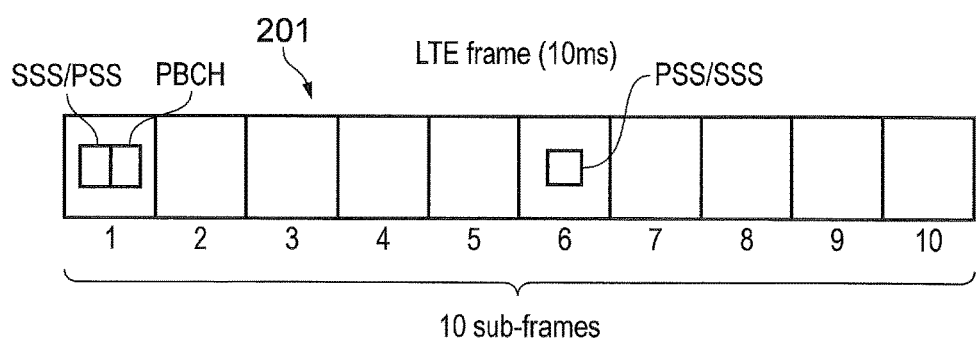
FIG. 2 provides a schematic diagram illustrating an LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
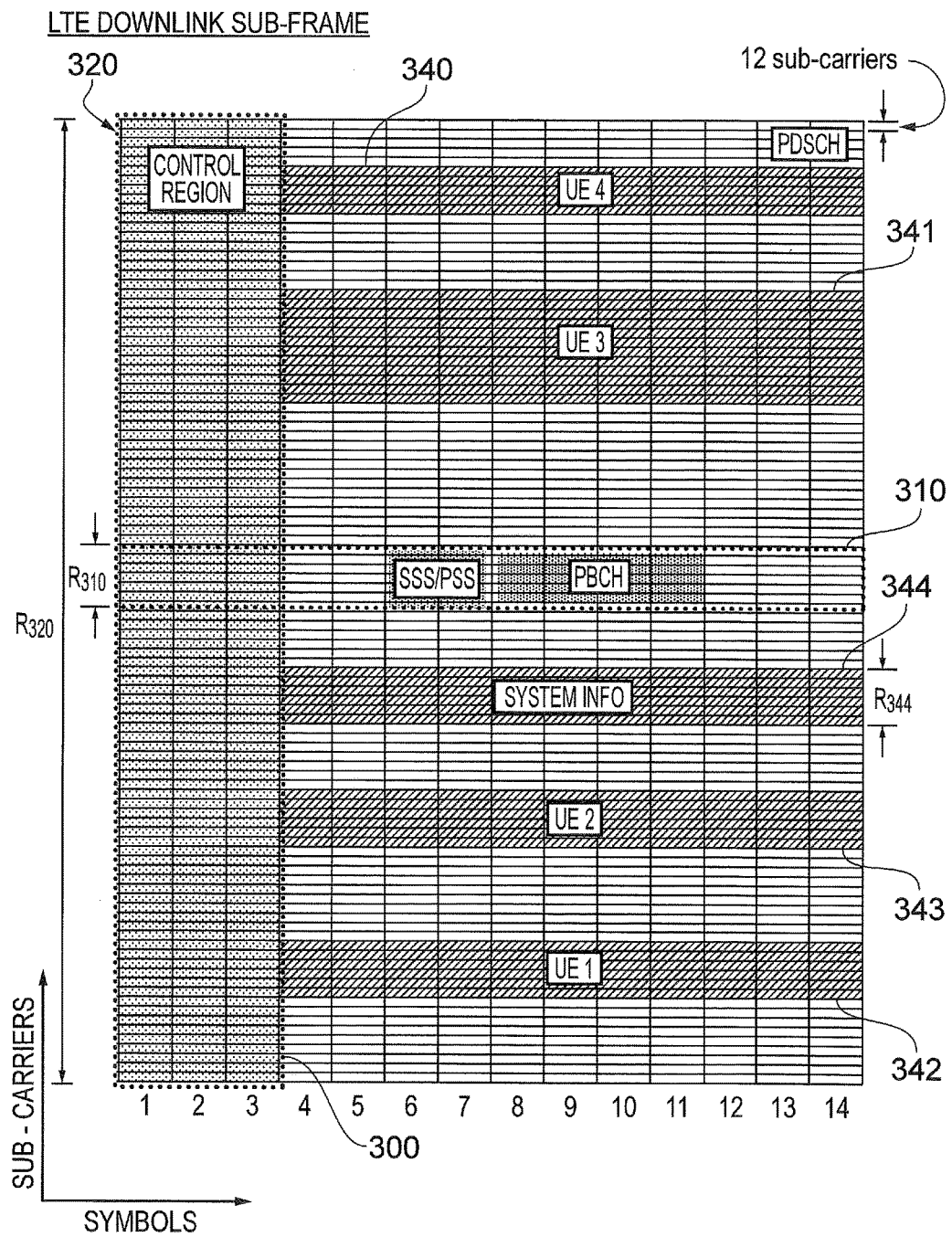
FIG. 3 provides a schematic diagram illustrating an example of an LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licenced for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over six blocks of twelve subcarriers (i.e. 72 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to LTE carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals).

This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow an LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer). FIG. 3 also shows a region of PDSCH containing system information and extending over a bandwidth of R344. A conventional LTE subframe will also include reference signals which are not shown in FIG. 3 in the interests of clarity.

The number of subcarriers in an LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

Figure 4:
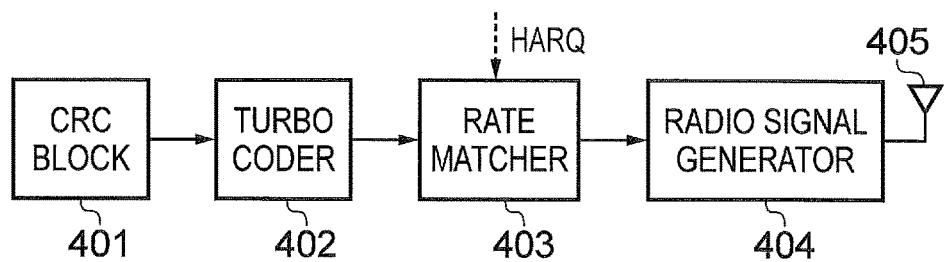
FIG. 4 provides a schematic diagram illustrating an example of elements for transmitting an LTE signal.
Figure 5:
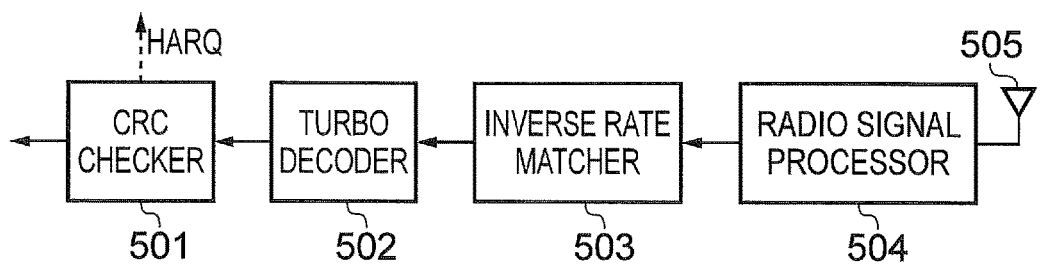
FIG. 5 provides a schematic diagram illustrating an example of elements for receiving an LTE signal.

FIG. 4 and FIG. 5 provide schematic diagrams illustrating an example of elements for transmitting and receiving an LTE signal, respectively. These figures correspond to the PDSCH channel. Corresponding elements are used on the transmitter and receiver sides. On the transmitter side, an incoming bit signal has a CRC (cyclic redundancy check) calculated and appended by CRC block 401. This signal is then encoded using a turbo coder 402 for encoding the signal for transmission and a rate matcher 403 for selecting the bits to be transmitted in a given sub-frame to achieve a given code rate and/or BLock Error Rate (BLER). The rate matcher 403 can take into account HARQ reports when deciding on a code rate with a view to achieving a target BLER. The signal can then be further processed in what has been schematically and artificially represented as a single "radio signal generator" 404 for the sake of conciseness. This generator 404 may implement any appropriate functions such as scrambling, OFDM modulation, etc. The signal can then be emitted by the antenna 405.

On the receiver side, the signal will first arrive at the antenna 505 and then be processed by the radio signal processor 504. The radio signal processor 504 has also been schematically and artificially represented as a single element for the sake of conciseness and can essentially carry out the inverse functions to those carried out by the generator 404. The signal is then processed by the inverse rate matcher 503 and the resulting bit stream is decoded by the turbo decoder 502 and forwarded to a CRC checker 501. Essentially, the CRC check checks for data integrity of the data block that it receives as an input. The result of the CRC checker 501 can be used by the HARQ function for reporting errors in transmissions. In some examples, if a corrupted data block has been identified by the CRC checker 501 and reported by the HARQ function, when the data block is transmitted again by the transmitter and received by the receiver, the receiver can use both the original and the retransmitted data blocks to try to decode the information. In this case, referred to as "soft combining", the soft bits (where the soft bits can for example correspond to log-likelihood ratios of the bits comprising the received modulation symbols) corresponding to the corrupted data block are not discarded but are stored instead and they can then be combined with the retransmitted signal. This technique makes use of information received during two receptions of the same original data bits in order to increase the chances of arriving at a successful decoding. If the data block has been reliably decoded, it can then be processed in the expected manner, for example it can be forwarded to other elements for processing. Combining of the soft bits can occur in the inverse rate matcher 503, even when the rate matching and modulation parameters change between transmission of the same information bits. When the rate matching and modulations parameters do not change between transmissions, the combining can occur in the radio signal processor 504.

It is noteworthy that for the PDCCH channel, repetition decoding can happen in the radio signal processor 504, as the number of bits transmitted on the PDCCH is likely to be unknown to the UE in view of the UE performing blind decoding of the PDCCH based on several possible alternative hypotheses of the number of bits transmitted on the PDCCH.

Figure 6:
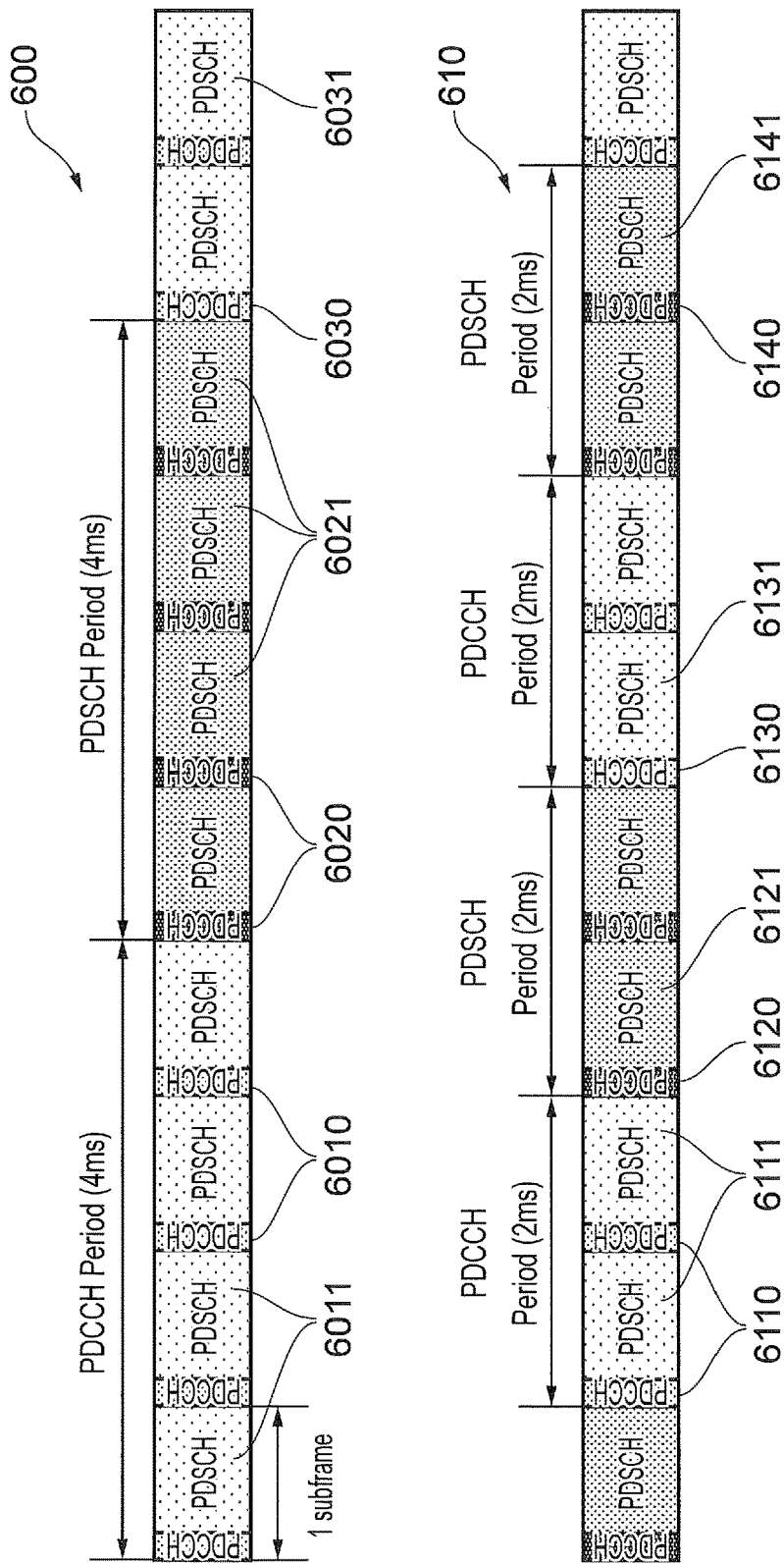
FIG. 6 provides a schematic diagram illustrating examples of downlink repetition.

FIG. 6 provides a schematic diagram illustrating examples of downlink repetition. In the first example 600, the number of repetitions for PDCCH/PDSCH signals is four, while the number of repetitions for PDCCH/PDSCH signals in the second example 610 is two. In these examples, the sub-frames are subsequently assigned to a PDCCH period for four or two sub-frames, respectively, then to a PDSCH period for four or two sub-frames, respectively, then to another PDCCH period, and so on. These PDCCH and PDSCH periods are defined with respect to one or more terminals and different terminals served by the same base station may have different PDCCH/PDSCH periods, or may not have any repetitions. When transmitting data to a terminal using repeated sub-frames, the PDCCH period is used for repeating one or more PDCCH signals for the terminal in the resource allocation portion of the sub-frames. In the example transmission 600, the four portions 6010 are used for repeating the same resource allocation signal for this terminal four times and in the example transmission 610, the two portions 6110 (and then 6130) are used for repeating the same resource allocation signal for this terminal twice.

Likewise, the PDSCH period is used for repeating one or more PDSCH signals for the terminal in the data transmission portion of the sub-frames. In the example transmission 600, the four portions 6021 are used for repeating the same data transmission signal for this terminal four times and in the example transmission 610, the two portions 6121 (and then 6141) are used for repeating the same data transmission signal for this terminal twice. Therefore, the terminal receiving this type of transmission can decode the PDCCH section only during the PDCCH period and the corresponding PDSCH section only during the PDSCH period for receiving the downlink transmissions.

It is noteworthy that while one UE is decoding a PDCCH Period, another UE may be decoding a PDSCH period. for example, in the transmissions shown in 600, a first UE can be receiving the PDCCH marked 6010 while a second UE receives the PDSCH marked 6011.

In practice, when decoding a PDCCH or PDSCH signal, the terminal will receive the first instance of the signal and if it can pass the CRC check, the signal will be successfully decoded. If on the other hand the first instance of the signal does not pass the CRC check, the terminal will listen to the second instance of the same signal and combine the first and second instances and attempt to process the signal. If the combined signal now passes the CRC check, it has been successfully received. On the other hand, if it does not pass the CRC check, the terminal can listen to another instance of the signal and so on, until either the signal is successfully decoded or the decoding has been unsuccessful once all the instances of the signal have been transmitted. If a positive CRC check is obtained before the end of the PDCCH period, the terminal can then turn its decoder off and wait for the PDSCH period. Alternatively, the terminal may store all instances of the signal received during the relevant period and, at the end of the period, it can combine the soft bits of the received signals and try to decode the signal based on the combined signal. When adding the soft bits, the terminal can for example add the soft bits before the inverse rate matcher 503, such as at the radio signal processor 504 level, and then perform the inverse rate matching and turbo decoding and CRC checking at the inverse rate matcher 503, turbo decoder 502 and CRC checker 501, respectively, based on the combined signal. This method of decoding can be applied when the rate matching and modulation parameters are identical between transmissions. This method can be applied to both the data channels (e.g. PDSCH) and the control channels (e.g. PDSCH).

As can be seen in the above example the "number of repetitions" as used herein refers to the number of times that a signal is transmitted. If for example a signal is transmitted once, i.e. with no actual repetition of the signal, the number of repetitions will be one. If the signal is sent twice (i.e. repeated once), the number of repetitions will be two. This can be extended to a situation where a signal is not sent, which can then be considered to correspond to a number of repetitions of zero. It is noteworthy that this is merely a convention and that in another example the number of repetitions could be defined as the number of additional retransmissions of the signal, such that it would set to zero, one and minus one, respectively, in the three examples just mentioned. The teachings of the present invention apply regardless of the convention used for counting the number of repetitions.

Repetition is useful for MTC applications. MTC devices are likely to have simple low-power emitters and receivers and some devices are unlikely to be very mobile. Some MTC devices, such as smart meters, are likely to be powered by a main power source, rather than by a battery. Other MTC devices, such as health monitors are likely to be mobile and battery powered. A typical use case for repetition is the case of a smart meter which remains in the same location and which transmits information such as meter readings. Such a device may for example sit at the edge of a cell and, in poor channel conditions, may only be able to receive transmissions when they are repeated. Each signal transmitted by the base station would need to be transmitted multiple times before it can be successfully decoded. Using repetitions, the base station can transmit the same signal several times, for example 100 times, and by adding the received signals, the MTC terminal can effectively receive a signal with 100 times more energy, thereby improving the coverage for the MTC device at the edge of the cell. The trade-off resulting from this technique is that the throughput that can be achieved decreases by the same ratio that the received energy increases: when sending signals twice, the total received energy can be doubled while the throughput is halved. This trade-off is aligned with the needs of some MTC devices, such as smart meters, as these types of device only require low throughput, and the effective received energy (and hence coverage) can be artificially increased using repetition.

In practice, for stationary MTC terminals, the number of repetitions can be decided for example based on a power received for a single transmission. For example, for a meter in an underground location, the signal coverage may be poor and it may be estimated that an appropriate number of repetitions may be 100 while it may be determined as being 20 for another meter in the same premises but in an over-ground location. Once the appropriate number of repetitions has been set, the base station can transmit repeated signals using this number of repetitions, knowing that the channel to the UE is not changing, and the MTC device can decode signals knowing that the base station is repeating signals for this specific number of times.

This use case does not however translate very well for a conventional non-static terminal. For example, if the terminal is in a first location, then repeating signals 100 times may not be necessary and may thus introduce a significant and unnecessary delay. On the other hand, if the number of repetitions is lowered and the terminal then moves to a different location, the number of repetitions may then not be enough for successful decoding of transmissions and the terminal may therefore unnecessarily waste battery attempting to decode signals with a resulting power which is too low to enable a successful decoding. In other words, current repetitions techniques are not particularly well suited to non-MTC terminals which may experience significant difficulties, in particular with respect to battery depletion, and/or delays in receiving transmissions. It is therefore desirable to provide a repetition arrangement which is better adapted to non-static terminals.

Figure 7:
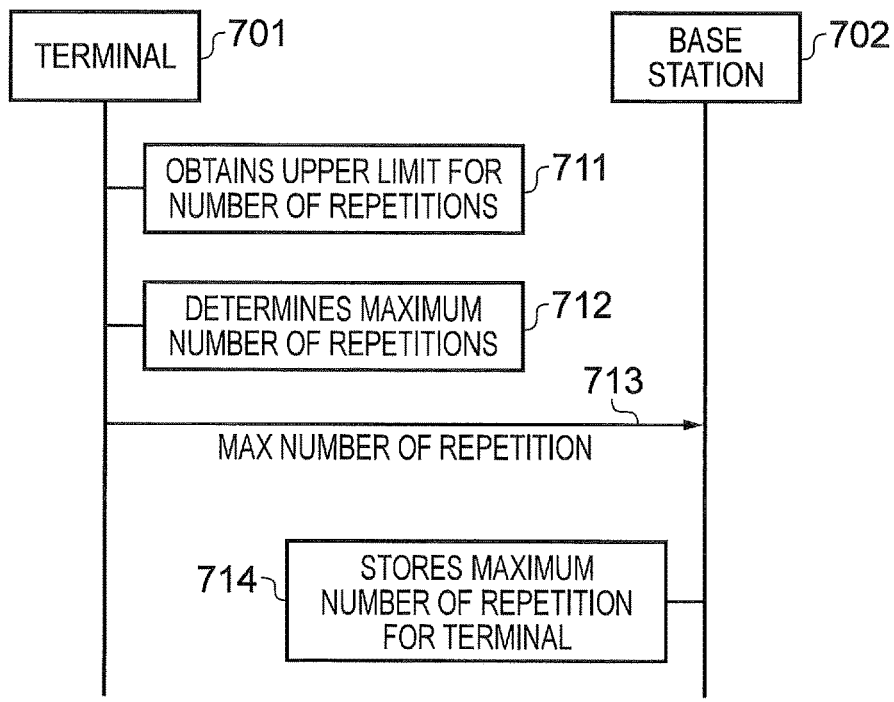
FIG. 7 provides a schematic ladder diagram illustrating example methods according with the present disclosure.

FIG. 7 provides a schematic ladder diagram illustrating example methods according with the present disclosure. The example of FIG. 7 illustrates how a maximum number of repetitions for a terminal 701 can be set and stored by the base station 702. At the first step 711, the terminal obtains an upper limit "Nup" for the number of repetitions that the terminal 701 can support. The terminal may for example be limited by physical aspects (such as an electronic component's capabilities, etc.), battery capacity (the UE needs to limit the number of times it repeats reception or transmission of a signal with the goal of not depleting its battery resources) and/or by logical aspects (such as a software limitation). An upper limit of 100 will be used in the following discussions as an illustration and it will be understood that any appropriate limitation on the number of repetitions may be used in accordance with the present disclosure. Then, at step 712, the terminal 701 determines a maximum number of repetitions "Nmax" it wishes to use. For example, terminal plugged-in to a power source and being relatively stationary may decide to use 100 as the maximum number of repetition. If however the terminal is using its battery as the sole power source and is running low on battery, the maximum number of repetitions may be set to a lower value, for example 40 or 60, such that the terminal reduces the risk of draining its battery trying to receive transmissions. In another example, if the terminal is relatively mobile (i.e. non-stationary), it may estimate that having too many repetitions is likely to be counter-productive and may set the maximum number of repetitions value to a lower value, for example, 30, 50 or 70. The terminal may take a variety of aspects into account. For example, it may set the maximum number of repetitions value "Nmax" based on one or more of: a battery status (such as a remaining battery capacity), a type of power source, an energy saving mode, an estimated or expected mobility, an expected level of coverage, an input received from a user, etc. This maximum number of repetition is used to limit the number of repetitions used for downlink transmissions and is selected to be less than or equal to Nup, the upper limit for the number of repetitions supported by the terminal. The step 712 may be performed whenever deemed appropriate, for example at start-up, whenever at least one of the relevant conditions changes by a certain predetermined amount or reaches a certain predetermined level, upon receipt from the base station 702 of a new calculation request, following a user input, etc. A new calculation of the maximum number of the number of repetitions is then carried out. For example, if the battery charge falls below 20%, the value Nmax may be reduced by a certain amount and/or by a certain ratio.

Once Nmax has been set, the terminal 701 transmits the Nmax value, or an indicator of the value, to the base station 702 at step 713. The base station may then store the value Nmax for this terminal for use when downlink data is to be transmitted to the terminal 701.

Figure 8:
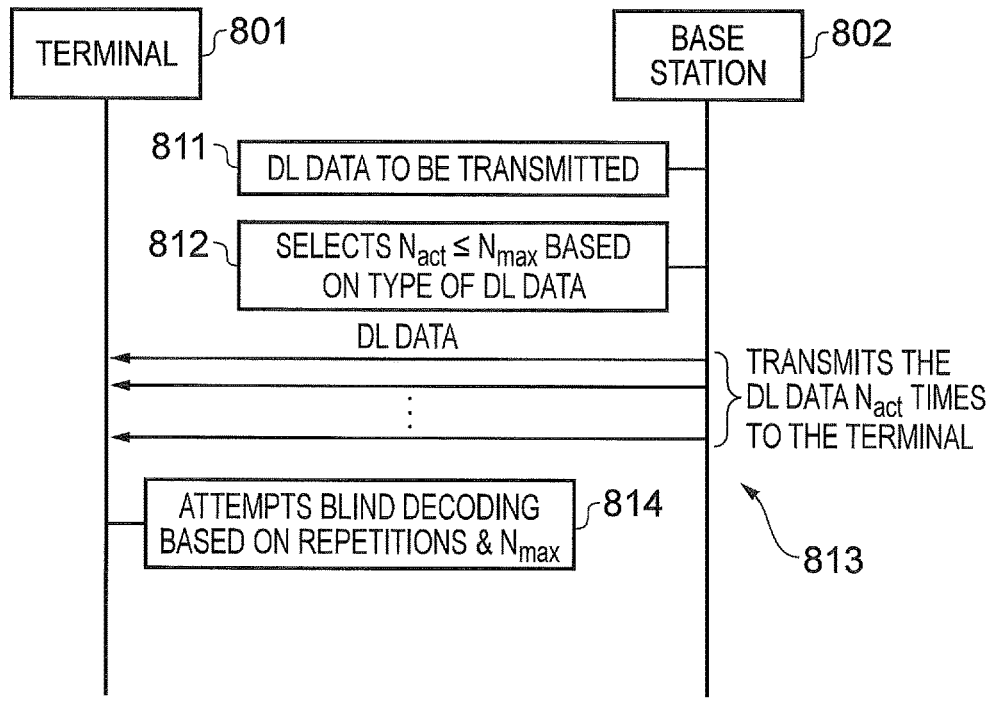
FIG. 8 provides a schematic ladder diagram illustrating other example methods according with the present disclosure.

FIG. 8 provides a schematic ladder diagram illustrating other example methods according with the present disclosure. These methods relate to a base station 802 transmitting data to a terminal 801 and to the terminal 801 receiving data from the base station 802. First, at step 811, the base station 802 detects that downlink data is to be transmitted to the terminal 801. In the illustration of FIG. 8, it is assumed that the base station 802 already knows Nmax for this terminal but the base station may alternatively or additionally, obtain the Nmax value for this terminal from a different party (such as the terminal 801 itself, a Nmax database, etc.). In other words, the base station can then obtain Nmax for this terminal, whether it is obtained internally or externally and at step 812, it selects an actual number of transmissions Ntx for transmitting the data to the terminal 801. Ntx is selected to be less than or equal to Nmax and is based on the type of data. For example, the base station may identify that the data to be transmitted is data relating to an emergency message, to a public safety announcement or to a member of the user's family. In this case, the base station may decide to use a relatively high Ntx so that the terminal can be more likely to decode the data. On the other hand, if the data relates to a social network update, the data may only be transmitted at a relatively low Ntx so as to minimise the resources used for transmitting data which has a lower priority. The priority of the data may be determined depending on the service it relates to, such as a call, an emergency call, web browsing initiated by the user, a social media service, a radio or television service, etc. Other aspects may also be taken into account, such as the delay tolerance for the data or a required or recommended throughput required for the data. For example, call data is not tolerant to high delays while web browsing data can support much higher delays. It may therefore be decided to use a lower Ntx for data or services having a low delay tolerance and higher Ntx for data or services having a high delay tolerance.

In some examples the Ntx may be selected from the [1, Nmax] range while in other examples it may be selected from the [0, Nmax] range. In the latter case, the base station 802 could for example take the decision that for low priority data (e.g. social media updates), the data will not be transmitted to the terminal 801 which corresponds to "Ntx=0". Also, in other examples, the base station may select Ntx from one of the groups {0, 1, Nmax}, {0, Nmax} or {1, Nmax}. As an illustration, the base station 802 may decide either (1) to send the data using the maximum number of repetitions that the terminal 801 is currently willing to accept ("Ntx=Nmax") if the data has a high enough priority and/or meets the relevant conditions, or (2) not to send the data ("Ntx=0") if the data does not have a high enough priority and/or does not meet the relevant conditions.

Following the selection of the Ntx at step 812, the base station 802 then transmits the data by sending the corresponding signals to the terminal 801 Ntx times at step 813. In the example of FIG. 8, the terminal 801 attempts blind decoding of the data based on a number of repetitions less than or equal to Nmax at step 814. Blind decoding is further discussed below in particular in respect of FIG. 9. In other examples the terminal 801 may simply attempt to decode the transmissions based on a number of repetitions less than or equal to Nmax. At the end of step 814, the terminal 801 can reach a conclusion that the data transmitted by the base station 802 at step 813 has been successfully decoded or could not be decoded, e.g. based on the CRC result calculated by the receiver's CRC checker 501.

Accordingly, a terminal can receive data that has been transmitted a number of times which depends on a maximum number of repetitions that the terminal will accept and based on the type of data to be transmitted. As a result, the amount of repetition can be tailored to the terminal and/or data.

Figure 9:
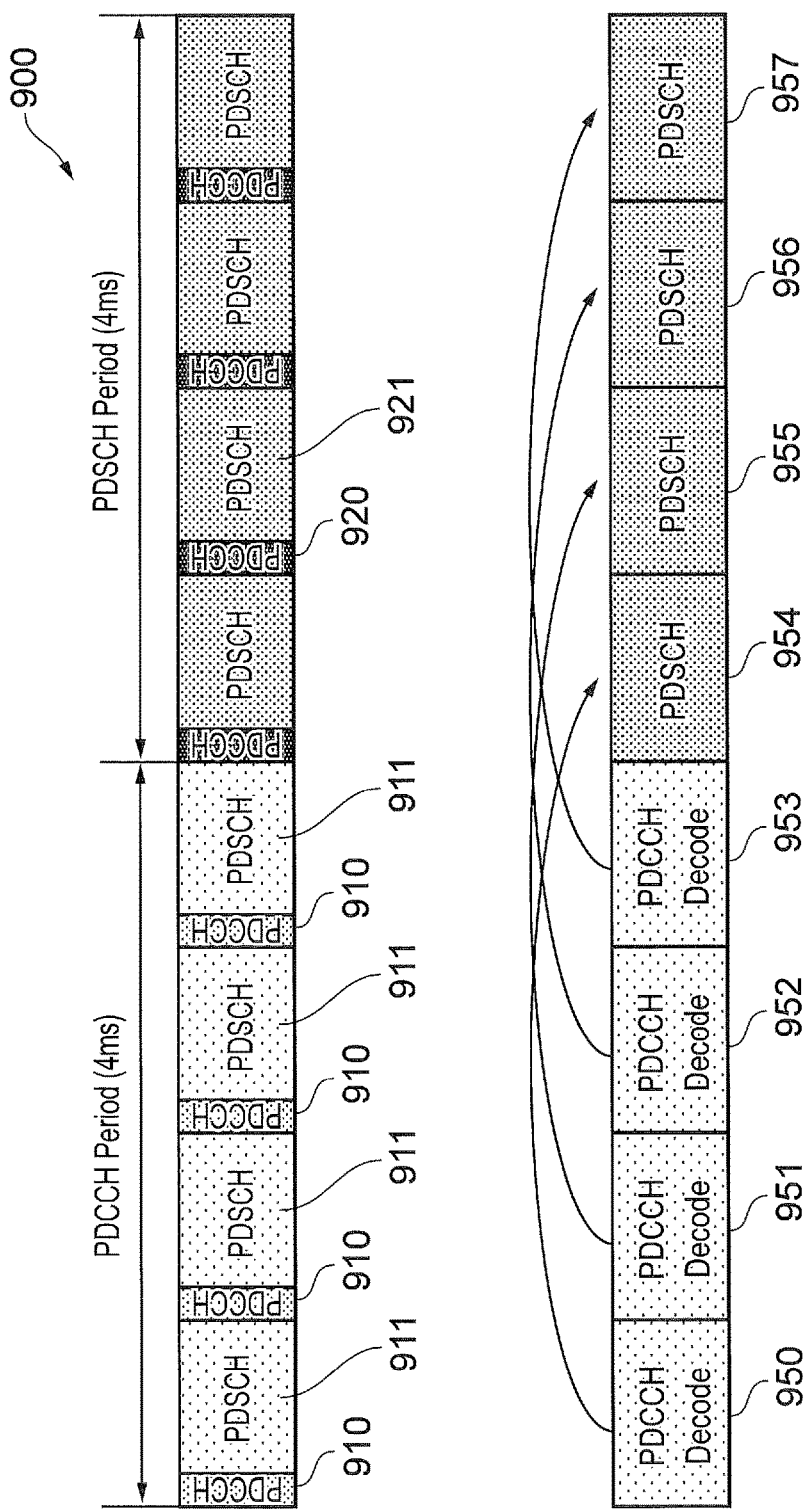
FIG. 9 provides a schematic diagram illustrating blind decoding of repeated transmissions.
Figure 9:
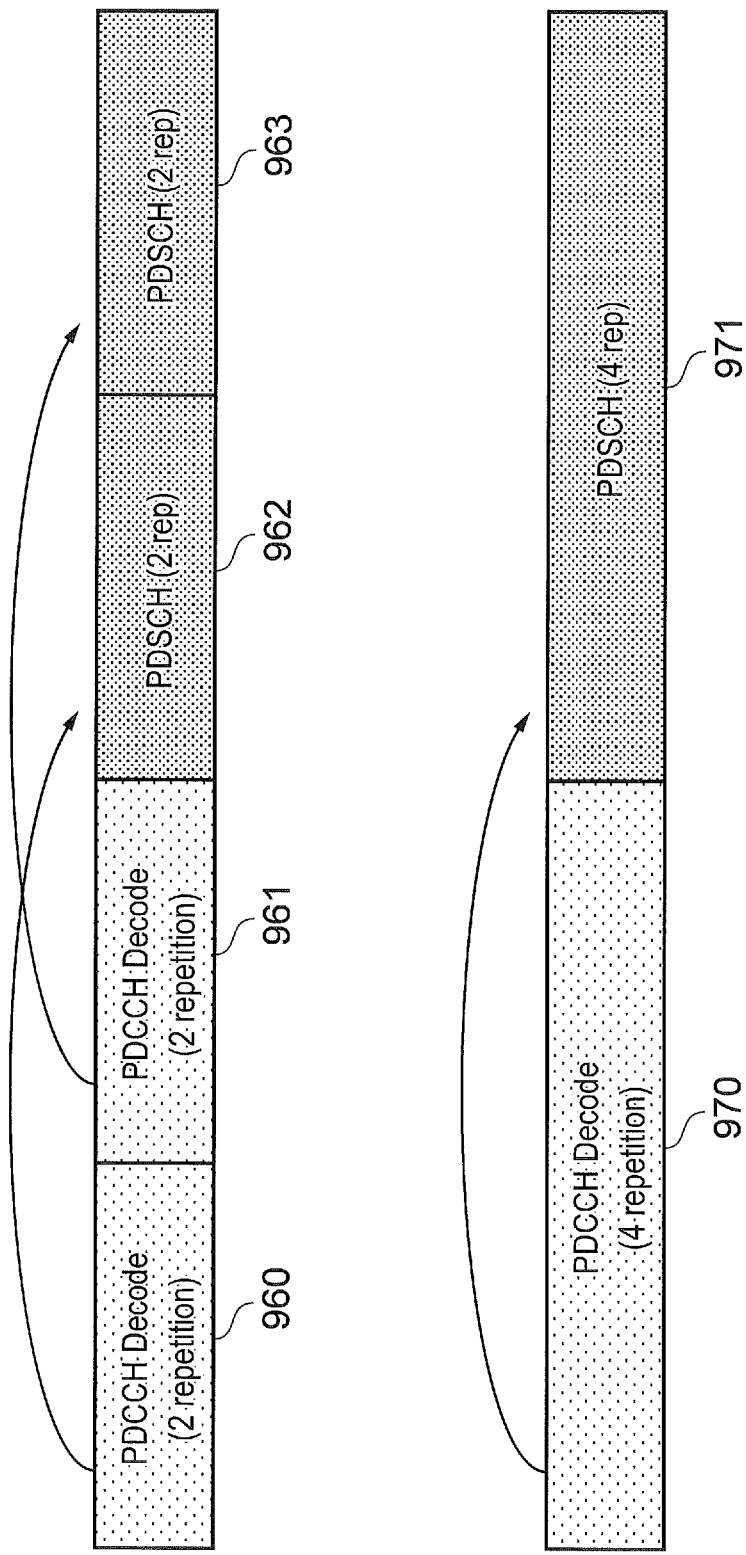

FIG. 9 provides a schematic diagram illustrating blind decoding of repeated transmissions in accordance with an aspect of the present disclosure. In this example, the resource allocation messages (in the PDCCH section of the sub-frames) are repeated up to four times and the data messages (in the PDSCH section of the sub-frames) are repeated up to four times as well. In other words both the PDCCH period and the PDSCH period correspond to four sub-frames, i.e. 4 ms in LTE. As discussed above in respect of FIG. 6, the PDCCH sections 910 of the PDCCH period are used to transmit allocation messages to the terminal which will not decode the PDSCH sections 911 of this period, and the PDSCH sections 921 of the PDSCH period are used to transmit data messages to the terminal which will not decode the PDCCH sections 920 of this period. In the case where the terminal does not know the actual number of repetitions used by the base station for the transmissions, the terminal can carry out blind decoding to attempt to decode the transmissions whilst not know the number of repetitions. The terminal can attempt to decode the transmissions assuming a certain number of repetitions has been used and, if the decoding is unsuccessful, attempt to decode the transmissions assuming a different number of repetitions. For the sake of clarity, the assumed number of repetitions used by the terminal when attempting to decode the downlink transmissions will be referred to as "Ndec". In the example of FIG. 9, the terminal knows the Nmax value and thus knows that any transmissions it receives have been transmitted (or repeated) a number of times between 1 and Nmax (1 and Nmax included) where Nmax=4 and, in this particular example, the number of repetitions used can only be a multiple of two, i.e. only values 1, 2 and 4 could have been used by the base station. First, the terminal will try to decode the PDCCH section for Ndec=1 with a view to identifying any resource allocation messages for this terminal in the PDCCH sections for each of the sub-frames 950-953. If the terminal can successfully decode any of the resource allocation messages, it will then attempt to decode the PDSCH section for each of the sub-frames 954-957, where a resource allocation message in sub-frame 950, 951, 952 or 953 corresponds to allocated resources allocated in sub-frame 954, 955, 956 or 957, respectively. In the event that the terminal is unable to decode the transmissions when assuming Ndec=1 (for example unable to decode the relevant PDCCH transmissions), the terminal can increase Ndec to the next possible value, in this case Ndec=2 and try again. In this example, this would result in the terminal attempting to decode the PDCCH sections assuming repetition of the signals in the first pair 960 of sub-frames and in the second pair of sub-frames 961. If resource allocation messages are successfully decoded in pairs 960 and 961, the terminal will attempt to decode the corresponding allocated resources. In this example, the terminal will attempt to decode the PDSCH sections in corresponding pairs of sub-frames 962 and 963. Likewise, if this attempt is unsuccessful, the terminal will attempt to decode the PDCCH section assuming Ndec=4, the last possible Ndec value and, if a correct CRC is found at this decoding stage, the terminal will attempt to decode the corresponding allocated resources in the PDSCH section of the group 971 of four sub-frames. The terminal can thus decode downlink transmissions sent using repetition even though it does not know in advance the actual number of repetitions used for sending the transmissions.

In the example of FIG. 9, the terminal starts with Ndec=1 for decoding the PDCCH increasing to Nmax via each possible value every time the decoding is unsuccessful. However, in other examples, the terminal may try with various Ndec values in any order. For example, the terminal can start with Ndec=Nmax and gradually decrease the value of Ndec after unsuccessful attempts, or may try in any other order. It is also noteworthy that when a reference is made to an unsuccessful decoding, this failure to decode the signals could be identified if either signals are being communicated to the terminal but have been received in a corrupted form (e.g. the CRC check is negative) or if no signals have been communicated to the terminal such that no data with a positive CRC has been decoded. In other words, an unsuccessful decoding will cover all cases but successful decoding cases (where a positive CRC is obtained).

Figure 10:
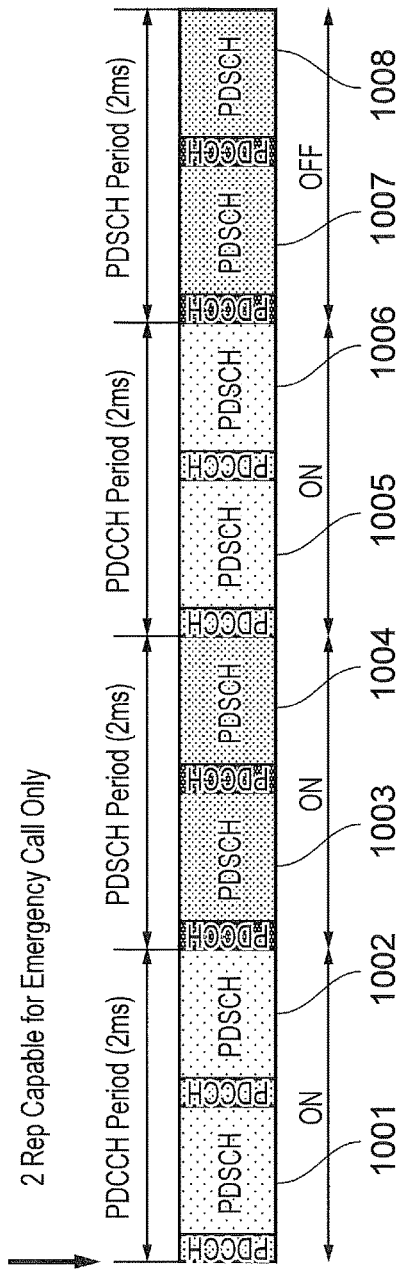
FIG. 10 provides a schematic diagram illustrating an example of the operation of a terminal in accordance with the present disclosure.
Figure 11:
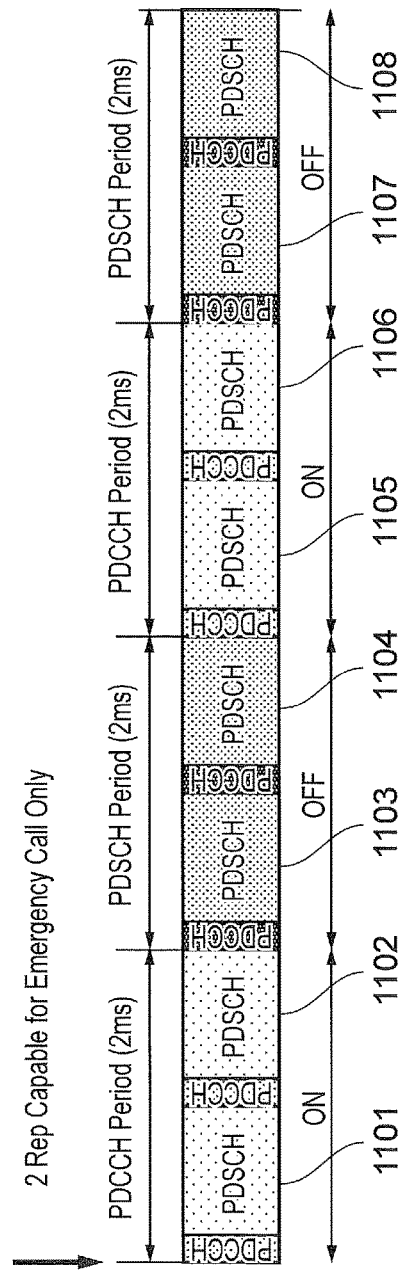
FIG. 11 provides a schematic diagram illustrating another example of the operation of a terminal in accordance with the present disclosure.

FIGS. 10 and 11 illustrate an example of the operation of a terminal in accordance with the present disclosure. In both cases, the maximum number of repetitions for the PDCCH and the PDSCH is set to 2 and the base station is operable to configure the repetition of signals based on the type of traffic, and in particular dependent on whether the incoming traffic relates to emergency services (where an "emergency service" could be related to a traditional emergency service, such as a police notice, tsunami warning etc., or could be related to a high priority service, such as a parent attempting to find a lost child). In the case of FIG. 10, the base station receives downlink traffic relating to an emergency call while, in the case of FIG. 11, the base station receives downlink traffic relating to a social media update. The base station knows that the terminal is capable of receiving repeated signals and has indicated different maximum number of repetitions for the two traffic types. For example it has indicated Nmax=2 for the emergency services and Nmax=1 for the social network updates. Alternatively, the UE could just signal Nmax=1 for the social network updates and it would be understood by both the base station and the terminal that emergency services can use any number of repetitions up to a maximum defined in the specifications. The base station can then decide on the actual number of repetitions to use for downlink transmissions based on the type of traffic and any other suitable parameter, such as channel conditions. In the case of FIG. 10, the downlink data relates to an emergency call such that it is likely to be assigned the highest priority level. The base station can then transmit the data to the terminal using a repetition of 2; in this case the same amount of repetition is applied for both the PDCCH and PDSCH messages. Thus, for the sub-frames 1001 and 1002 of the first PDCCH period, the base station transmits resource allocation information to the terminal, wherein the same resource allocation signals are transmitted in sub-frames 1001 and 1002. As this is a PDCCH period, the terminal will have its receiver turned on so that it can listen to communications in the PDCCH section for any messages addressed to it. Then, during the first PDSCH period consisting of sub-frames 1003 and 1004, the base station transmits the emergency call data to the terminal, with a repetition of 2. That is, the same data signals are transmitted in sub-frames 1003 and 1004. On the receiving side, the terminal is aware from the resource allocation received at sub-frames 1001 and 1002 that it is expecting data in the next PDSCH period and it will thus keep its receiver on for sub-frames 1003 and 1004. It will then attempt to decode the data transmission sent via sub-frames 1003 and 1004. On the other hand, if the base station no longer has downlink data to transmit to the terminal, it will not allocate resources to the terminal for the next PDSCH period and will therefore not include any allocation information for this terminal in the next PDCCH period consisting of sub-frames 1005 and 1006. As a result, the terminal will not expect any data in the PDSCH period consisting of sub-frames 1007 and 1008 and will therefore turn its receiver off for this PDSCH period, thereby saving power and thus reducing battery utilisation.

In the example of FIG. 11, the incoming downlink data relates to a social network update. This type of traffic is unlikely to relate to a high priority services and can thus be given a low priority, for example by way of attributing a low priority index to the traffic. The base station, knowing that the type of traffic is of a low priority, can then decide not to transmit the data to the terminal, if the terminal is in channel conditions that would require large amounts of repetition (in this example, 2 repetitions are considered to be a "large amount", for the sake of simplicity of the figures). In other words, the base station will not include any resource allocation message in the PDCCH for sub-frames 1101 or 1102 (PDCCH period) and will not include any data in the PDSCH for sub-frames 1103 and 1104 (PDSCH period) as it would normally be expected to do. On the receiving side, the terminal will not find any resource allocation message in the PDCCH of sub-frames 1101 and 1102 such that it will not expect to receive any data in the PDSCH of sub-frames 1103 and 1104 and will thus be able to turn its receiver off for the entire duration of the next PDSCH period. As the base station no longer has any data to transmit to the terminal, the description of the operation of the base station and of the terminal for sub-frames 1105-1108 corresponds to that of sub-frames 1005-1008 of FIG. 10. The discussion of these sub-frames will thus not be repeated herein, for the sake of conciseness.

As can be seen for the discussion of FIGS. 10 and 11, by adapting the number of repetitions to the type of traffic and based on a number of repetitions that has been indicated by the terminal, energy savings can be achieved.

There has therefore been provided an arrangement where the number of repetitions to be used for transmitting or receiving downlink data can be tailored or selected based on a maximum number of repetitions that the terminal will accept and on any other relevant parameter, such as the type of traffic to be transmitted or the battery depletion status of the terminal. Accordingly, the terminal can decode PDCCH up to the maximum repetition level that the UE can tolerate for any application. The base station will only schedule the UE with repetition levels that are commensurate with the priority of the application. Since the UE decodes PDCCH up to the maximum repetition level, it can always decode PDCCH relating to important applications. It can turn its receiver off during the "PDSCH period" if it is not scheduled. Compared to an arrangement where the maximum number of repetition Nmax is not communicated to the base station, the base station will attempt to transmit to the UE with large numbers of repetitions even when the UE is not able to decode those transmissions. In doing so, the base station's rate control function (such as a function that attempts to determine the appropriate number of repetitions to apply for transmissions to a UE) will not be able to function correctly The base station rate control function is traditionally used to determine a modulation and coding rate to be used in DL transmissions (see for example the discussion of rate control in R1-124517 [7]), but can be straightforwardly adapted to determine the number of repetitions to be used for DL transmissions. In the rate control function, the base station decides on the amount of coverage extension to apply using a closed loop monitoring process: if the there is no response from the terminal or if a response is received indicating that the base station's transmission was not received by the UE (either of these cases are indications of failure of the transmission to the terminal device), the base station tries more repetition and if there is a response from the terminal (indicating that the base station's transmission was received by the UE: an indication of success of the transmission to the terminal device), the base station tries using less repetition. If the terminal then decides that it is no longer going to receive more than a predetermined number of repetitions Nmax which is for example lower than the value assumed by the base station and it does not inform this value of Nmax to the base station:

When the base station does not receive a response from the terminal, or a response indicating NACK (negative acknowledgement) for a certain number of repetitions, it will try to send the data again with an increased amount of repetition applied.

The terminal will still not respond to the new transmission as the number of repetitions is too high for the terminal to receive it.

The base station performs the above increase in the amount of repetition until the maximum number of repetitions that the base station is designed to apply is reached.

Such a mode of operation will waste physical resources in the network without achieving an actual transmission of data to the terminal and is therefore not desirable.

In the present disclosure, when a reference is made to a terminal decoding a PDCCH or PDSCH section, as the skilled person will understand, the terminal may only be attempting to decode part of the PDCCH or PDSCH, respectively. For example, the terminal may only try to decode the resources elements of the PDSCH which have been allocated to the terminal (via the PDCCH).

Even though in the above description of the figures the same number of repetitions has been used for the PDSCH signals and for the PDCCH signals, in other examples different number of repetitions can be used for these channels. This applies to the upper limit, maximum and/or actual number of repetitions for the terminal. The maximum number of repetitions for PDCCH signals ("Nmax-ra") and for the PDSCH signals ("Nmax") can be communicated together or separately to the base station. In one example, the PDSCH repetitions can have a maximum of 10 repetitions and the PDCCH repetitions can have a maximum of 20 repetitions. As a result, the PDSCH period would be of 10 ms and the PDCCH period would be of 20 ms. Also, in the blind decoding example of FIG. 9, for a successful decoding of the PDCCH at a number of repetitions Ndec-ra, the same number of repetitions was assumed for decoding the PDSCH ("Ndec"). However in other examples Ndec may be different from the number Ndec-ra for successfully decoding the PDCCH. In some cases, there may be a ratio between Ndec and Ndec-ra, which may also correspond to a ratio between Nmax and Nmax-ra.

It is noteworthy that even though the present disclosure has been discussed in the context of LTE, its teachings are not limited to LTE or to other 3GPP standards and, in particular, even though the terminology is the same or similar to that of the LTE standard, the teachings are not limited to the present version of LTE and could apply equally to any appropriate arrangement not based on LTE and/or compliant with any other future standard. For example, any discussion of PDCCH and PDSCH sections can be understood to relate more generally to any resource allocations message and data message portions of a transmission. Additionally, in other examples the transmissions may not be designed to include separate allocation and data portions to be decoded separately and/or may not include any resource allocation portion at all.

In the above examples, the repetition periods have been formed of consecutive sub-frames and the periods are themselves adjacent to one another. In other examples, the periods may be arranged differently. For example, a repetition period for repeating the same signal may be formed of non-adjacent sub-frames and the periods may not be adjacent. For example, in the example of FIG. 10, the PDCCH period may consist of sub-frames 1001 and 1003, the PDSCH period may consist of sub-frames 1005 and 1006 and the next PDCCH period may consist of sub-frame 1008 and of another sub-frame, not represented on FIG. 10 but which would have been allocated number 1010 using the sub-frame numbering of this figure.

In the present disclosure, the decision regarding the number of repetitions to use for the downlink transmission has generally been described as being made by the base station. While this is fully within the scope of the present disclosure, in other examples, this decision could also be made by another entity or element which then informs the base station of the Ntx to use for the downlink transmission to the terminal. The base station would then simply execute the transmission in accordance with the decision made by the other entity.

The different numbers of repetitions to use for downlink transmissions, regardless of the transmission being of a resource allocation message for transmitting data or to the transmission of the data, can take any appropriate value. For example, in some cases Nmax can be selected from any of the following (non-exhaustive) list of sets of values: the [0, Nup] range of naturals, the {0, Nup} set, {Nup}, any power of two in the [0, Nup] range, the {0, 1, Nup} set, etc., or any combination thereof. Likewise, the Ntx value can be selected from any of the following (non-exhaustive) list of sets of values: the [0, Nmax] range of naturals, the {0, Nmax} set, {Nmax}, any power of two in the [0, Nmax] range, the {0, 1, Nmax} set, etc., or any combination thereof. It is also within the scope of the present disclosure that Nmax may take "1" as a value, if appropriate.

Additionally, whereas in some cases the terminal can carry out blind decoding for every possible Ndec value in the [1, Nmax] range, in other cases the terminal will only attempt to decode the downlink transmissions for a limited subset of Ndec values (e.g. as illustrated in FIG. 9), or for a single Ndec value such as Ndec=Nmax. If for example the base station is configured to select Ntx is from the {0, Nmax} set, where Nmax is set by the terminal, the terminal will either not receive downlink data, or receive it with a Nmax repetition. The terminal can then attempt to decode all incoming signals assuming an Nmax repetition only.

According to the present disclosure, the repetition numbers are specific to a terminal such that two terminals served by the same base station do not necessarily use the same repetition number. Likewise, the repetition periods, such as the PCCCH and PDSCH periods discussed herein, can have different durations for different terminals and/or can start at different times for different terminals.

Additionally, even though in the discussion of the examples above only one value of the maximum repetition number for a terminal has been discussed, in other cases the terminal could select and indicate two or more maximum numbers of repetitions. For example, in a system where traffic is classified based on a priority level selected from 1 to 5, the terminal could select and indicate a first maximum number of repetitions for traffic with a priority level of 4 or 5 and a second maximum number of repetitions for traffic with a priority level of 3 or less. For example, the terminal may be willing to have more repetition for high priority traffic with a view to increasing the chances of successfully receiving the traffic, at the expense of battery power consumption, and to have less repetition for lower priority traffic, which is less critical.

In addition to the type of traffic, the number of repetitions Ntx may be selected based on a terminal-specific configuration. For example, the terminal may be associated with a setting such that either repetition is used with Nmax, or no traffic is to be sent. Such a terminal-specific configuration may be set or stored at the terminal and/or the base station. For example, some types of lower priority traffic may be allocated Ntx=0 by the base station so that it is not transmitted to the terminal. Such a comparison of Nmax with Nup may involve transmitting the Nup number to the base station, if appropriate, or in other cases, Nup can be retrieved from a database. In this case, Nmax can be compared to one or more fractions of Nup, for example 80% of Nup and 40% of Nup so at to achieved a better granularity in response to the value at which Nmax has been set.

This may also be generalised and the Ntx may be derived from a comparison between Nmax and a reference number of repetitions "Nref". If for example Nup=100 and Nref=80, then a Nmax set to 90 could result in a different Ntx for the downlink transmissions than if Nmax is for example 70. The previous example can be viewed as the specific example use of the parameter Nref, where Nref is set with respect to Nup.

The type of data may be identified based on the service or application requesting the transmission. For example if the data relates to an emergency service, it may be treated differently than if it relates to a video service. The type of data may be identified from an Access Point Name (APN), also called PDN Identity, or any other type of existing identifier or messages. Additionally or alternatively new identifiers may be used when identifying the type of data to be transmitted. For example the base station may be able to allocate a priority number to the traffic based on an inspection of at least part of the packet so as to determine what the traffic relates to. Any other suitable type of classification may be used in accordance with the present disclosure.

The number Nmax, and any other number of repetitions that may be transmitted by the terminal to the base station may be communicated in any appropriate manner. In some cases, the terminal may use explicit signalling, for example including an indicator for Nmax in RRC signalling to the base station and/or use differential signalling, for example indicating that Nmax can be increased or decreased. The differential signalling may in some examples includes only an "up" or "down" indication and the terminal and base station may know by how much to increase or decrease the value of Nmax. Optionally, the "up" or "down" indication may also in some or all cases include an indication of the difference between the previous value for Nmax and the new value for Nmax. For example, the terminal may send differential signalling indicating "−20" where the minus sign indicates that the Nmax should be decreased and "20" that it should be decreased by 20. In another example, the terminal may use a "not received" indicator. While ACK/NACK signalling indicates that a user has successfully or unsuccessfully, respectively, received data on a PDSCH, the new "not received" signalling may indicate that the terminal has not attempted to receive or decode the PDSCH. This signalling may be used as an indication to decrease the maximum number of repetitions applied by the base station, for example because the terminal decided not to attempt to receive the PDSCH with a view to saving battery.

As used herein, the expression "greater than" is intended to explicitly cover both "greater than or equal to" and "greater than but not equal to". Likewise, the expression "less than" is intended to explicitly cover both "less than or equal to" and "less than but not equal to".

As used herein, transmitting information or a message to an element may involve sending one or more messages to the element and may involve sending part of the information separately from the rest of the information. For example, if measurement configuration information sent by a base station to a terminal includes an identification of inactive channels to monitor and of active channels that can be used for generating measurement results for the inactive channels, the inactive channel(s) identification information may be sent in a first message (or a first group of messages) and the active channel(s) identification information may be sent separately in a second message (or second group of messages). The base station may later update the active channel(s) identification information without updating the inactive channel(s) identification. All of these example communications are thus intended to be covered as examples of "transmitting (this type of) measurement configuration information" to the terminal.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Respective features of the present disclosure are defined by the following numbered paragraphs:

Clause 1. A method of transmitting downlink data in a mobile communications system, wherein the mobile communications system comprises a base station configured to communicate wireless signals to one or more terminal devices, the method comprising:
 receiving an indicator of a maximum number of downlink repetitions "Nmax" currently accepted by a terminal device, wherein a number of downlink repetitions indicates a number of times that the same signal is transmitted to the terminal device;
 setting an actual number of downlink repetitions "Ntx" so that the actual number of downlink repetitions meets the condition Ntx≤Nmax; and
 transmitting the downlink data, to the terminal device, wherein the downlink data is transmitted via a signal transmitted a number of times equals to the actual number of downlink repetitions.

Clause 2. A method according to clause 1 wherein the setting of the actual number of downlink repetition is, based on the type of downlink data to be transmitted to the terminal device.

Clause 3. A method according to clause 2 wherein the type of downlink data comprises a priority level for the downlink data.

Clause 4. A method according to clause 2 or 3 wherein the type of downlink data is at least partially derived from the type of service or application requesting the data transmission.

Clause 5. A method according to any of clauses 1 to 4 comprising:
 retrieving a reference number of downlink repetitions for the terminal device,
 wherein the setting of the actual number of downlink repetitions is based on a comparison between the maximum number of downlink repetitions "Nmax" currently accepted by a terminal device and the reference number of downlink repetitions.

Clause 6. A method according to any of clauses 1 to 5 wherein the setting of the actual number of downlink repetitions comprises:
 deciding whether to transmit the downlink data to the terminal device based on the type of downlink data;
 if it is decided to transmit the downlink data, setting the actual number of downlink repetitions so that it meets the condition 1≤Ntx≤Nmax; and
 if it is decided not to transmit the downlink data, setting the actual number of downlink repetitions to zero.

Clause 7. A method according to any of clauses 1 to 6 wherein the base station is configured to communicate wireless signals to the one or more terminal devices in a series of time sub-frames, wherein sub-frames comprise a first section for resource allocation and a second section for data transmission and wherein transmitting the downlink data to the terminal device comprises:
 transmitting a resource allocation message for the downlink data and for the terminal device via a first set of one or more sub-frames in the first section; and
 subsequently transmitting the downlink data in a second set of N sub-frames in the second section wherein N is the actual number of repetitions.

Clause 8. A method according to clause 7 wherein the sub-frames are grouped in a first time period for repeating resource allocation signals and in a second time period for repeating data signals and wherein
 the first set of one or more sub-frames consists of adjacent sub-frames starting at the start of the first time period; and
 the second set of one or more sub-frames consists of adjacent sub-frames starting at the start of the second time period.

Clause 9. A method according to clause 7 or 8, wherein the first set of one or more sub-frames consists of N sub-frames.

Clause 10. A method according to any of clauses 1 to 9 wherein the actual number of downlink repetitions is set based on indications of success for past transmissions to the terminal device.

Clause 11. A base station for transmitting downlink data in a mobile communications system, wherein the base station is configured to communicate wireless signals to one or more terminal devices, the base station being configured to:
 receive an indicator of a maximum number of downlink repetitions "Nmax" supported by a terminal device, wherein a number of downlink repetitions indicates a number of times that the same signal is transmitted to the terminal device;
 set an actual number of downlink repetitions "Ntx" so that the actual number of downlink repetitions meets the condition Ntx≤Nmax; and
 transmit the downlink data, to the terminal device, wherein the downlink data is transmitted via a signal transmitted a number of times equals to the actual number of downlink repetitions.

Clause 12. Circuitry for a base station for transmitting downlink data in a mobile communications system, wherein the base station is configured to communicate wireless signals to one or more terminal devices and wherein the circuitry comprises a controller element and a transceiver element configured to operate together to:
 receive an indicator of a maximum number of downlink repetitions "Nmax" supported by a terminal device, wherein a number of downlink repetitions indicates a number of times that the same signal is transmitted to the terminal device;
 set an actual number of downlink repetitions "Ntx" so that the actual number of downlink repetitions meets the condition Ntx≤Nmax; and transmit the downlink data, to the terminal device, wherein the downlink data is transmitted via a signal transmitted a number of times equals to the actual number of downlink repetitions.

Clause 13. A method of receiving downlink data at a terminal in a mobile communications system, wherein the mobile communications system comprises a base station configured to communicate wireless signals to one or more terminal devices, the method comprising:
   obtaining a maximum number of downlink repetitions "Nmax" for downlink transmissions to the terminal wherein a number of downlink repetitions indicates a number of times that the same signal is transmitted to the terminal device;
   setting the value of a decoding number of repetitions for downlink data "Ndec" at a first value wherein 1≤Ndec≤Nmax; and
   attempting to decode downlink data transmissions based on the decoding number of repetitions for downlink data.

Clause 14. A method according to clause 13 wherein the method further comprises:
   if the downlink data transmissions have not been successfully decoded for the decoding number of repetitions for downlink data:
      if the Ndec is equal to the Nmax, detecting an unsuccessful decoding of the downlink data transmissions; and
      if the Ndec is not equal to the Nmax, selecting a new Ndec which is greater than and not equal to the previous Ndec and which is less than or equal to the Nmax, and returning to the step of attempting to decode downlink data transmissions.

Clause 15. A method according to clause 13 or 14 wherein the first value is one.

Clause 16. A method according to clause 13 or 14 wherein the first value is Nmax.

Clause 17. A method according to any of clauses 13 to 16, wherein the base station is configured to communicate the wireless signals to the one or more terminal devices in a series of time sub-frames, wherein sub-frames comprise a first section for resource allocation and a second section for data transmission and wherein attempting to decode downlink data transmissions comprises:
   attempting to decode resource allocation transmissions in the first section of sub-frames; and
   if resource allocation transmissions in the first section of sub-frames have been successfully decoded, attempting to decode the data transmissions in the second sections of sub-frames based on the Ndec and on the decoded resource allocation signals.

Clause 18. A method according to clause 17 wherein attempting to decode resource allocation transmissions comprises attempting to decode resource allocation transmissions based on a decoding number of downlink repetition for resource allocation signals "Ndec-ra" and wherein, if resource allocation transmissions in the first section of sub-frames have been successfully decoded, attempting to decode the data transmissions in the second sections of sub-frames comprises attempting to decode the data transmissions in the second section of sub-frames with Ndec set to the Ndec-ra for the successful decoding of the resource allocation transmissions.

Clause 19. A method according to clause 17 or 18 wherein the method comprises
   obtaining a maximum number of downlink repetitions "Nmax-ra" for downlink resource allocation transmissions to the terminal;
   and wherein attempting to decode resource allocation transmissions comprises:
      attempting to decode resource allocation transmissions based on a decoding number of downlink repetition for resource allocation signals "Ndec-ra", wherein the Ndec-ra is first set at a second value such that 1≤Ndec-ra≤Nmax-ra;
      if resource allocation signals in the first section of sub-frames have not been successfully decoded:
         if the Ndec-ra is equal to Nmax-ra, detecting an unsuccessful decoding of the downlink resource allocation transmissions;
         if the Ndec-ra is not equal to Nmax-ra, selecting a new Ndec-ra which is greater than and not equal to the previous Ndec-ra and which is less than or equal to Nmax-ra, and returning to the step of attempting to decode resource allocation transmissions.

Clause 20. A method according to clause 19 wherein the second value is one.

Clause 21. A method according to clause 19 wherein the second value is Nmax-ra.

Clause 22. A method according to any of clauses 19 to 21 wherein Nmax-ra is equal to Nmax.

Clause 23. A method according to any of clauses clause 17 to 22, wherein the sub-frames are grouped in a first time period for repeating resource allocation signals and in a later second time period for repeating data signals and wherein, if resource allocation transmissions are successfully decoded for sub-frames of the first-time period, the step of attempting to decode the data signals is carried out for sub-frames of the second time period.

Clause 24. A method according to clause 23 comprising, in the event that resource allocation transmissions in the first section of sub-frames have not been successfully decoded or that no resource allocation transmissions for the terminal have been received, turning off a receiver for the terminal for the duration of the second period.

Clause 25. A terminal device for receiving downlink data at a terminal in a mobile communications system, wherein the mobile communications system comprises a base station configured to communicate wireless signals to one or more terminal devices, the terminal device being configured to:
   obtain a maximum number of downlink repetitions "Nmax" for downlink transmissions to the terminal wherein a number of downlink repetitions indicates a number of times that the same signal is transmitted to the terminal device;
   set the value of a decoding number of repetitions for downlink data "Ndec" at a first value wherein 1≤Ndec≤Nmax; and
   attempt to decode downlink data transmissions based on the decoding number of repetitions for downlink data.

Clause 26. Circuitry for a terminal device for receiving downlink data at a terminal in a mobile communications system, wherein the mobile communications system comprises a base station configured to communicate wireless signals to one or more terminal devices, wherein the circuitry comprises a controller element and a transceiver element configured to operate together to:
   obtain a maximum number of downlink repetitions "Nmax" for downlink transmissions to the terminal wherein a number of downlink repetitions indicates a number of times that the same signal is transmitted to the terminal device;

set the value of a decoding number of repetitions for downlink data "Ndec" at a first value wherein 1≤Ndec≤Nmax; and attempt to decode downlink data transmissions based on the decoding number of repetitions for downlink data.

Clause 27. A method of setting a maximum number of downlink repetitions parameter for downlink transmissions in a mobile communications system, wherein the mobile communications system comprises a base station configured to communicate wireless signals to one or more terminal devices, the method comprising:

obtaining an upper limit "Nup" for the number of downlink repetitions supported by a terminal device, wherein a number of downlink repetitions indicates a number of times that the same signal is transmitted to the terminal device;

determining, based on the upper limit, a maximum number of downlink repetitions so that the maximum number of downlink repetitions is less than or equal to the upper limit; and transmitting an indicator of the maximum number of downlink repetitions to a base station.

Clause 28. A method according to clause 27, wherein the determining of the maximum number of downlink repetitions is further based on a status of the terminal device.

Clause 29. A method according to clause 27 or 28, wherein the status of the terminal device comprises a status of a power source for the terminal device.

Clause 30. A terminal device for setting a maximum number of downlink repetitions parameter for downlink transmissions in a mobile communications system, wherein the mobile communications system comprises a base station configured to communicate wireless signals to one or more terminal devices, the terminal device being configured to:

obtain an upper limit "Nup" for the number of downlink repetitions supported by the terminal device, wherein a number of downlink repetitions indicates a number of times that the same signal is transmitted to the terminal device;

determine, based on the upper limit and on a status of the terminal device, a maximum number of downlink repetitions so that the maximum number of downlink repetitions is less than or equal to the upper limit; and transmit an indicator of the maximum number of downlink repetitions to a base station.

Clause 31. Circuitry for a terminal device for setting a maximum number of downlink repetitions parameter for downlink transmissions in a mobile communications system, wherein the mobile communications system comprises a base station configured to communicate wireless signals to one or more terminal devices, wherein the circuitry comprises a controller element and a transceiver element configured to operate together to:

obtain an upper limit "Nup" for the number of downlink repetitions supported by the terminal device, wherein a number of downlink repetitions indicates a number of times that the same signal is transmitted to the terminal device;

determine, based on the upper limit and on a status of the terminal device, a maximum number of downlink repetitions so that the maximum number of downlink repetitions is less than or equal to the upper limit; and transmit an indicator of the maximum number of downlink repetitions to a base station.

Clause 32. A wireless telecommunication system comprising:

A terminal device according to clause 25 or 30; and

A base station according to clause 11.

Clause 33. Computer software which, when executed by a computer, causes the computer to perform the method of any one of Clause 1 to Clause 10, Clause 13 to Clause 24 and Clause 27 to Clause 29.

Clause 34. A storage medium which stores computer software according to Clause 33.

Clause 35. Any preceding Clause wherein the terminal devices and the base station are operable to communicate at least one of: a 3GPP communication protocol, an LTE communication protocol, a 4G communication protocol.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-01)/3GPP TS 36.211 version 11.5.0 Release 11
[3] ETSI TS 136 212 V11.4.0 (2014-01)/3GPP TS 36.212 version 11.4.0 Release 11
[4] ETSI TS 136 213 V11.6.0 (2014-03)/3GPP TS 36.213 version 11.6.0 Release 11
[5] ETSI TS 136 321 V11.5.0 (2014-03)/3GPP TS 36.321 version 11.5.0 Release 11
[6] ETSI TS 136 331 V12.3.0 (2014-09)/3GPP TS 36.331 version 12.3.0 Release 12
[7] R1-124517 3GPP TSG-RAN1#70bis, San Diego, Calif., USA, 8-12 Oct. 2012

What is claimed is:

1. A method of transmitting downlink data in a mobile communications system, wherein the mobile communications system comprises a base station configured to communicate wireless signals to one or more terminal devices, the method comprising:

receiving an indicator of a maximum number of downlink repetitions (Nmax) currently accepted by a terminal device, wherein a number of downlink repetitions indicates a number of times that a same signal is transmitted to the terminal device;

deciding whether to transmit the downlink data to the terminal device based on a type of the downlink data;

setting, in response to deciding to transmit the downlink data, an actual number of downlink repetitions (Ntx) so that the actual number of downlink repetitions Ntx satisfies a condition 1≤Ntx≤Nmax;

setting, in response to deciding not to transmit the downlink data, the actual number of downlink repetitions Ntx to zero; and transmitting the downlink data, to the terminal device, via a signal transmitted a number of times equal to the actual number of downlink repetitions Ntx.

2. The method according to claim 1, wherein the setting of the actual number of downlink repetition Ntx is based on the type of the downlink data.

3. The method according to claim 2, wherein the type of the downlink data comprises a priority level for the downlink data.

4. The method according to claim 2, wherein the type of the downlink data is at least partially derived from a type of service or application requesting the data transmission.

5. The method according to claim 1, further comprising:

retrieving a reference number of downlink repetitions for the terminal device, wherein the setting of the actual number of downlink repetitions Ntx is based on a comparison between the maximum number of downlink repetitions Nmax currently accepted by the terminal device and the reference number of downlink repetitions.

6. The method according to claim 1, wherein
the base station is configured to communicate the wireless signals to the one or more terminal devices in a series of sub-frames,
sub-frames comprise a first section for resource allocation and a second section for data transmission, and
transmitting the downlink data to the terminal device comprises:
   transmitting a resource allocation message for the downlink data and for the terminal device via a first set of one or more sub-frames in the first section; and
   subsequently transmitting the downlink data in a second set of N sub-frames in the second section, wherein N is the actual number of repetitions.

7. The method according to claim 6, wherein
the sub-frames are grouped in a first time period for repeating resource allocation signals and in a second time period for repeating data signals,
the first set of one or more sub-frames consists of adjacent sub-frames starting at the start of the first time period, and
the second set of one or more sub-frames consists of adjacent sub-frames starting at the start of the second time period.

8. The method according to claim 6, wherein the first set of one or more sub-frames consists of N sub-frames.

9. The method according to claim 1 wherein the actual number of downlink repetitions Ntx is set based on indications of success for past transmissions to the terminal device.

10. Circuitry for a base station for transmitting downlink data in a mobile communications system, wherein the base station is configured to communicate wireless signals to one or more terminal devices, the circuitry comprising:
   controller circuitry and transceiver circuitry configured to operate together to:
      receive an indicator of a maximum number of downlink repetitions (Nmax) supported by a terminal device, wherein a number of downlink repetitions indicates a number of times that a same signal is transmitted to the terminal device;
      decide whether to transmit the downlink data to the terminal device based on a type of the downlink data;
      set, in response to deciding to transmit the downlink data, an actual number of downlink repetitions (Ntx) so that the actual number of downlink repetitions Ntx satisfies a condition $1 \leq Ntx \leq Nmax$;
      set, in response to deciding not to transmit the downlink data the actual number of downlink repetitions Ntx to zero; and,
      transmit the downlink data, to the terminal device, via a signal transmitted a number of times equal to the actual number of downlink repetitions Ntx.

11. A method of receiving downlink data at a terminal device in a mobile communications system, wherein the mobile communications system comprises a base station configured to communicate wireless signals to one or more terminal devices, the method comprising:
   obtaining a maximum number of downlink repetitions (Nmax) for downlink transmissions to the terminal device, wherein a number of downlink repetitions indicates a number of times that a same signal is transmitted to the terminal device;
   setting a decoding number of repetitions for do link data (Ndec) at a first value, wherein $1 \leq Ndec \leq Nmax$;
   attempting to decode downlink data transmissions based on the decoding number of repetitions for downlink data Ndec; and
   in response to the downlink data transmissions being not successfully decoded:
      detecting, in response to the Ndec being equal to the Nmax, an unsuccessful decoding of the downlink data transmissions; and
      in response to the Ndec being less than the Nmax, selecting a new Ndec which is greater than the previous Ndec and which is less than or equal to the Nmax, and again attempting to decode downlink data transmissions.

12. The method according to claim 11, wherein the first value is one.

13. The method according to claim 11, wherein the first value is Nmax.

14. The method according to claim 11, wherein
the base station is configured to communicate the wireless signals to the one or more terminal devices in a series of sub-frames,
sub-frames comprise a first section for resource allocation and a second section for data transmission, and
the attempting to decode the downlink data transmissions comprises:
   attempting to decode resource allocation transmissions in the first section of sub-frames; and
   attempting, if the resource allocation transmissions in the first section of sub-frames have been successfully decoded, to decode the data transmissions in the second sections of sub-frames based on the Ndec and on the decoded resource allocation signals.

15. A method according to claim 14, wherein
the attempting to decode the resource allocation transmissions is based on a decoding number of downlink repetition for resource allocation signals (Ndec-ra), and
if resource allocation transmissions in the first section of sub-frames have been successfully decoded, the attempting to decode the data transmissions in the second sections of sub-frames comprises attempting to decode the data transmissions in the second section of sub-frames with Ndec set to the Ndec-ra for the successful decoding of the resource allocation transmissions.

16. The method according to claim 14, wherein
the method comprises obtaining a maximum number of downlink repetitions (Nmax-ra) for downlink resource allocation transmissions to the terminal, and
the attempting to decode the resource allocation transmissions comprises:
   attempting to decode the resource allocation transmissions based on a decoding number of downlink repetition for resource allocation signals (Ndec-ra), wherein the Ndec-ra is first set at a second value such that $1 \leq Ndec\text{-}ra \leq Nmax\text{-}ra$;
   if resource allocation signals in the first section of sub-frames have not been successfully decoded:
      detecting, if the Ndec-ra is equal to Nmax-ra, an unsuccessful decoding of the downlink resource allocation transmissions; and
      if the Ndec-ra is not equal to Nmax-ra, selecting a new Ndec-ra which is greater than the previous Ndec-ra and which is less than or equal to Nmax-ra, and again attempting to decode the resource allocation transmissions.

17. The method according to claim 16, wherein the second value is one.

18. The method according to claim 16, wherein the second value is Nmax-ra.

19. The method according to claim 16, wherein Nmax-ra is equal to Nmax.

20. The method according to claim 14, wherein
the sub-frames are grouped in a first time period for repeating resource allocation signals and in a later second time period for repeating data signals, and
if resource allocation transmissions are successfully decoded for sub-frames of the first-time period, the attempting to decode the data signals is carried out for sub-frames of the second time period.

21. The method according to claim 20, further comprising, in an event that resource allocation transmissions in the first section of sub-frames have not been successfully decoded or that no resource allocation transmissions for the terminal have been received, turning off a receiver for the terminal device for a duration of the second period.

22. A terminal device for receiving downlink data in a mobile communications system, wherein the mobile communications system comprises a base station configured to communicate wireless signals to one or more terminal devices, the terminal device comprising:
circuitry configured to:
obtain a maximum number of downlink repetitions (Nmax) for downlink transmissions to the terminal device, wherein a number of downlink repetitions indicates a number of times that a same signal is transmitted to the terminal device;
set a decoding number of repetitions for downlink data (Ndec) at a first value wherein $1 \leq Ndec \leq Nmax$;
attempt to decode downlink data transmissions based on the decoding number of repetitions for downlink data Ndec; and
in response to the downlink data transmissions being not successfully decoded;
detect, in response to the Ndec being equal to the Nmax, an unsuccessful decoding of the downlink data transmissions; and
in response to the Ndec being less than the Nmax, select a new Ndec which is greater than the previous Ndec and which is less than or equal to the Nmax, and again attempt to decode downlink data transmissions.

\* \* \* \* \*